(12) United States Patent
Starykowicz et al.

(10) Patent No.: US 7,966,754 B2
(45) Date of Patent: Jun. 28, 2011

(54) ADAPTER FOR ATTACHING A TOOL TO A MACHINE

(75) Inventors: Andrew M. Starykowicz, Long Grove, IL (US); John F. Halterman, La Hulpe (BE)

(73) Assignee: Caterpillar Inc., Peoria, IL (US)

( * ) Notice: Subject to any disclaimer, the term of this patent is extended or adjusted under 35 U.S.C. 154(b) by 1200 days.

(21) Appl. No.: 11/366,712

(22) Filed: Mar. 2, 2006

(65) Prior Publication Data

US 2007/0204491 A1   Sep. 6, 2007

(51) Int. Cl.
*E02F 3/96* (2006.01)
(52) U.S. Cl. .................. 37/468; 37/443; 37/444; 403/3; 403/365
(58) Field of Classification Search .................. 37/468, 37/443, 444; 414/722, 724; 403/3, 4, 154, 403/155, 365, 176, 288, 321
See application file for complete search history.

(56) References Cited

U.S. PATENT DOCUMENTS

| | | | | | |
|---|---|---|---|---|---|
| 2,972,357 | A | * | 2/1961 | Ford et al. | 137/625.11 |
| 3,669,190 | A | * | 6/1972 | Sizer et al. | 166/387 |
| 3,876,000 | A | * | 4/1975 | Nutter | 166/106 |
| 4,023,425 | A | * | 5/1977 | Parker | 474/16 |
| 4,149,758 | A | * | 4/1979 | Livesay | 305/118 |
| 4,207,693 | A | * | 6/1980 | Hemphill | 37/195 |
| 4,251,182 | A | * | 2/1981 | Schroeder | 414/723 |
| 4,359,889 | A | * | 11/1982 | Kelly | 72/62 |
| 4,398,862 | A | * | 8/1983 | Schroeder | 414/723 |
| 4,400,898 | A | * | 8/1983 | Christensen et al. | 37/444 |
| 4,629,353 | A | * | 12/1986 | Burke | 403/154 |
| 4,772,150 | A | * | 9/1988 | Horton | 403/39 |
| 4,836,741 | A | * | 6/1989 | St. Louis et al. | 414/723 |
| 4,877,270 | A | * | 10/1989 | Phillips | 285/18 |
| 5,044,812 | A | * | 9/1991 | Ardelt et al. | 403/154 |
| 5,156,483 | A | * | 10/1992 | Mangas | 403/288 |
| 5,228,797 | A | * | 7/1993 | Ota et al. | 403/147 |
| 5,630,673 | A | * | 5/1997 | Krzywanos et al. | 403/158 |
| 5,716,056 | A | * | 2/1998 | Bokram | 279/46.2 |
| 5,927,665 | A | * | 7/1999 | Grabnic | 248/200 |
| 6,042,295 | A | * | 3/2000 | Barden | 403/158 |
| 6,857,842 | B2 | * | 2/2005 | Heiple | 414/723 |
| 7,204,656 | B2 | * | 4/2007 | Bjuhr | 403/4 |
| 7,309,186 | B2 | * | 12/2007 | Oertley | 403/288 |
| 7,367,739 | B2 | * | 5/2008 | Brock et al. | 403/39 |
| 2007/0166103 | A1 | * | 7/2007 | Paske | 404/117 |
| 2008/0138005 | A1 | * | 6/2008 | Aira et al. | 384/385 |

* cited by examiner

*Primary Examiner* — Thomas A Beach
*Assistant Examiner* — Matthew R Buck
(74) *Attorney, Agent, or Firm* — Finnegan, Henderson, Farabow, Garrett & Dunner LLP; Andrew Ririe

(57) ABSTRACT

An adapter for permitting non-standard work tools to be attached to a work machine for which they were not originally sized to fit. The adapter comprises a sleeve which fits into bores on the work machine. Pins for attaching the work tool to the machine in turn are inserted through the work tool and into the sleeves. The sleeves protect the joint through seals positioned both on an outer surface of a flange of the sleeve, and on an inner surface of the bore of the sleeve. The sleeves also include holes for permitting lubricant to pass from the sleeve's outer circumferential surface to its inner circumferential surface. The sleeves may be permitted to rotate relative to the work machine via bearings in the bores of the work machine.

6 Claims, 5 Drawing Sheets

Fig_2_

ADAPTER FOR ATTACHING A TOOL TO A MACHINE

TECHNICAL FIELD

The field of this invention is attaching work tools to work machines, such as construction and mining machinery.

BACKGROUND

Work machines may include, as non-limiting examples, hydraulic excavators, backhoe loaders, and wheel loaders. These work machines commonly have work tools pivotally attached to them. Hydraulic excavators and backhoe loaders, for example, may have digging buckets pivotally attached to the end of the machine's boom and stick. The bucket curls about its pivotal attachment to the stick under the force of a hydraulic cylinder to penetrate the soil and scoop it into the bucket. Wheel loaders, as another example, may have front buckets pivotally attached to the end of the loader's linkage. The bucket can tilt relative to the linkage under the force of a hydraulic cylinder to scoop soil out of a pile and into the bucket.

The pivotal attachment of these work tools is typically accomplished using a pin joint. A pin passes through both the machine and the work tool to hold the two together. The pin permits pivoting of the work tool and machine relative to one another, but prevents other relative motion. The machine and the work tool each include bores in which the pin is positioned.

The size of the bores in the machine and the work tool must correspond to the size of the pin. Different manufacturers may use pins with different diameters. Even among a single manufacturer's product line, different size machines may use pins of different diameters.

A work tool often cannot be easily used on a machine for which it was not originally sized, because the pin bore on the work tool does not correspond to the size of the pin for that machine. Thus, each machine may have a set of standard work tools which are sized for mounting to that particular machine. But it is difficult to mount any non-standard work tool to the machine. A work tool might be remachined to enlarge the pin bores formed on it so it can mount to a pin of a different diameter, but this would be an expensive and time consuming solution.

SUMMARY OF THE INVENTION

According to one embodiment of the invention, a sleeve comprises an elongated annular portion having a first end and a second end, and an inner circumferential surface and outer circumferential surface, a flange portion extending radially outward from near the first end of the elongated annular portion, the flange having outer circumferential surface whose diameter is greater than the diameter of the outer circumferential surface of the annular portion, a circumferential first O-ring groove formed on the inner circumferential surface of the annular portion between the first end and the second end, a first O-ring positioned in the first O-ring groove a circumferential second O-ring groove formed on the outer circumferential surface of the flange portion, and a second O-ring positioned in the second O-ring groove.

According to another embodiment of the invention, a method of attaching work tools to a work machine comprises providing a sleeve adapter having an elongated annular portion, and an inner circumferential surface and an outer circumferential surface, removing a first pin from pin bores formed in a work machine and in a first work tool, the first pin acting to hold the first work tool to the work machine in a pin joint before it is removed, inserting the sleeve adapter into the work machine pin bore, and inserting a second pin, whose diameter is smaller than the first pin, into a pin bore formed in a second work tool and then into the sleeve adapter to form a pin joint with the second work tool and the work machine whereby the second work tool can rotate relative to the work machine.

According to another embodiment of the invention, a method of attaching work tools to a work machine comprises providing a sleeve adapter having an elongated annular portion, and an inner circumferential surface and an outer circumferential surface, inserting the sleeve adapter into a work machine pin bore, the outer circumferential surface contacting a bearing positioned in the work machine pin bore, and inserting a pin into a work tool pin bore formed on a work tool, then inserting the pin into the sleeve adapter, the pin contacting the inner circumferential surface of the sleeve adapter, and the pin forming a pin joint with the work tool and the work machine whereby the work tool can rotate relative to the work machine.

DETAILED DESCRIPTION

The following is a detailed description of one exemplary embodiment which will illustrate the principles and application of the invention. However, this exemplary embodiment is not intended to define the full scope of the invention because other embodiments are possible, as will be appreciated by those of ordinary skill in this art. The full scope of the invention shall be defined by the attached set of claims.

Figure 1:
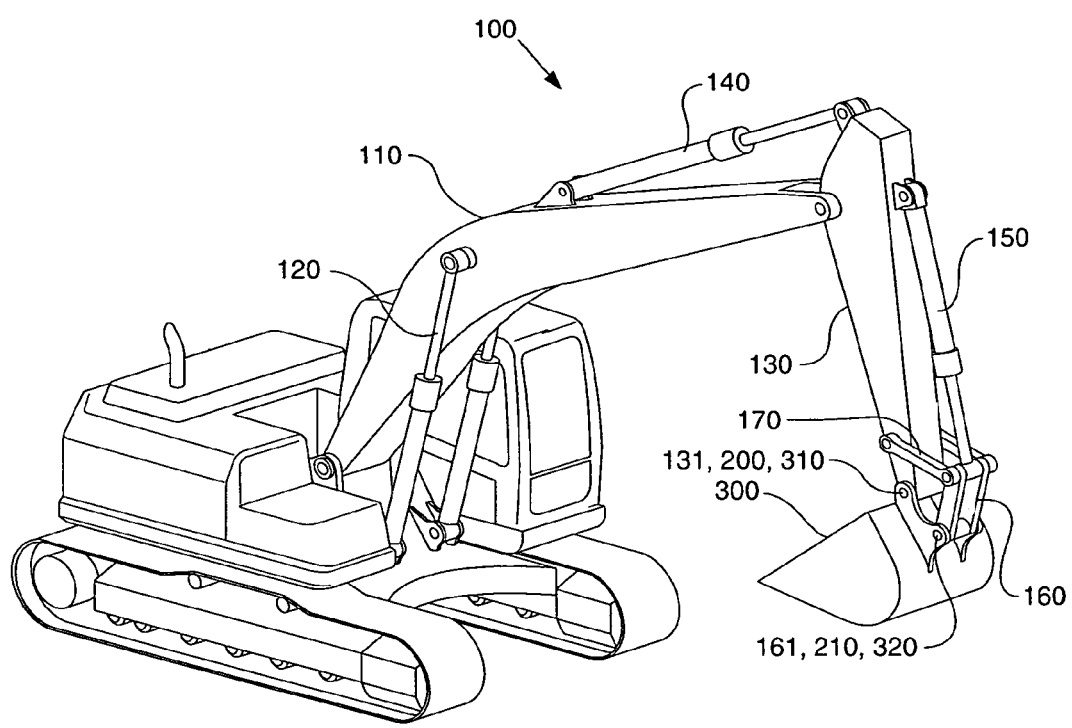
FIG. 1 is a exemplary view of a hydraulic excavator which may be used with the present invention.

FIG. 1 illustrates a typical hydraulic excavator which may be used with the present invention. The invention may be similarly applied to backhoe loaders, wheel loaders, and other work machines where a work tool or other device is attached to the machine with a pin joint. The excavator 100 includes a boom 110, a pair of boom cylinders 120, a stick 130, stick cylinder 140, a bucket 300, a bucket cylinder 150, a power link assembly 160, and an idler link assembly 170.

The bucket 300 is attached to each of the stick 130 and the power link assembly 160 with a pin joint. The pin joint permits the bucket 300 to rotate, but not translate, relative to the stick 130 and power link assembly 160. A first bucket pin 200 (see FIG. 3) attaches the bucket 300 to the stick 130. A pin bore. 131 formed in the stick 130 accepts first bucket pin 200. A set of pin bores 310 formed in the bucket 300 also accepts the first bucket pin 200. A second bucket pin 210 (see FIG. 3) attaches the bucket 300 to the power link assembly 160. A pin bore 161 formed in the power link assembly 160 accepts second bucket pin 210. A set of pin bores 320 formed in the bucket 300 also accepts the second bucket pin 210. The first bucket pin 200 and the second bucket pin 210 typically have different diameters, but could also have the same diameter.

Differently sized machines, or machines from different manufacturers, may use bucket pins of varying diameters. Because the bucket pin bores are sized to correspond to the diameters of the bucket pins, a bucket originally sized for a machine having bucket pins of a certain size, cannot be used with a different machine having bucket pins of a different size.

Figure 2:
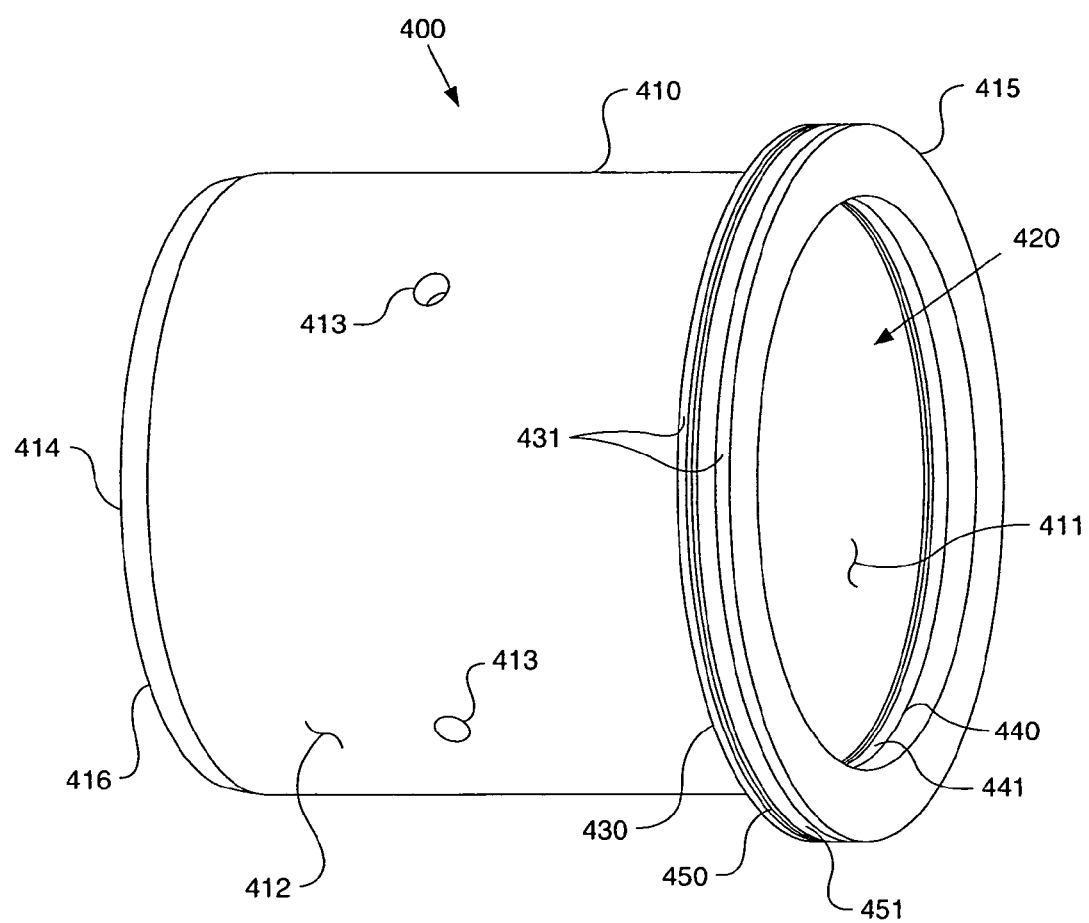
FIG. 2 is an isometric view of a sleeve adapter for fitting a non-standard bucket to the hydraulic excavator of FIG. 1.

FIG. 2 illustrates an embodiment of a sleeve adapter. The purpose of the sleeve adapter is to resolve the difficulty described above by allowing a bucket sized for certain bucket pin diameters to be used on machines which have larger bucket pin diameters.

The sleeve adapter 400 in FIG. 2 has a first elongated, annular portion 410. The annular portion 410 has an inner circumferential surface 411 and an outer circumferential surface 412. The inner circumferential surface 411 defines a bore 420. Passing entirely through the annular portion 410, from the inner circumferential surface 411 to the outer circumferential surface 412, are a plurality of grease holes 413. The annular portion 410 has a first end 414 and a second end 415. At the first end 414 is a tapered or beveled portion 416. Near the second end 415 is a flange 430. Flange 430 extends radially outward from outer circumferential surface 412. Flange 430 defines a continuous, outer flange circumferential surface 431 with a diameter greater than the diameter of outer circumferential surface 412.

Two O-ring grooves and O-rings are provided on the sleeve adapter 400 for sealing purposes. A first O-ring groove 440 is formed on the inner circumferential surface 411 of the annular portion 410. In the illustrated embodiment, the groove is continuous all around the inner circumferential surface 411, and closer to the second end 415 than the first end 414. A first O-ring 441 is positioned therein. A second O-ring groove 450 is positioned on the outer flange circumferential surface 431 of flange 430. In the illustrated embodiment, the groove is continuous all around the outer circumferential surface 431. A second O-ring 451 is positioned therein.

Figure 3:
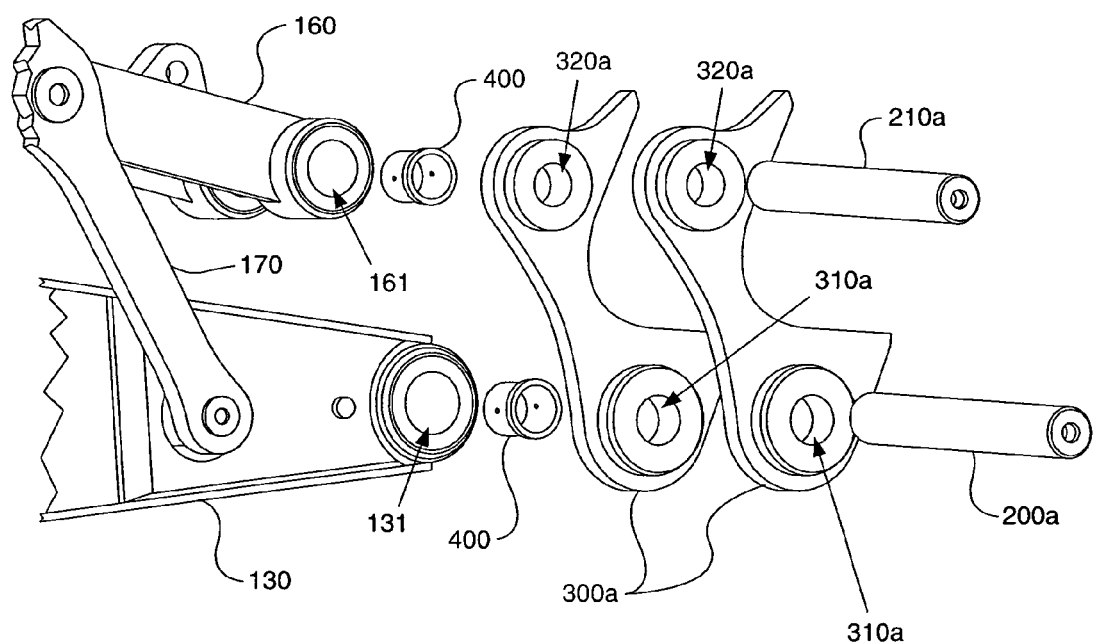
FIG. 3 is an exploded view showing the assembly of the sleeve adapter of FIG. 2 with a hydraulic excavator stick and bucket.

FIG. 3 is an exploded view illustrating how multiple sleeve adapters 400 could be assembled with a bucket, bucket pins, and a hydraulic excavator. It will typically be necessary to use two sleeve adapters 400 for each bucket pin. The sleeve adapters 400 will allow bucket pins of a smaller diameter to be positioned in the pin bores of the machine.

In FIG. 3, a bucket 300a and bucket pins 200a, 210a are illustrated which might normally be sized to fit on an excavator having smaller pin diameters than are used on the excavator 100 of FIG. 1. Sleeve adapters 400 will permit the bucket 300a and bucket pins 200a, 210a to be mounted to the excavator 100 even though the pin bores 131, 161 on excavator 100 are sized for larger bucket pins. Bucket pins 200a, 210a are normally sized for bucket 300a, so they fit as intended in the bores 310a and 320a of bucket 300a. In other words, the exterior diameters of pins 200a and 210a correspond to the internal diameters of bores 310a and 320a. The sleeve adapters 400 are sized to fit bucket pins 200a and 210a. Bores 420 of the adapters correspond to the outside diameters of bucket pins 200a and 210a. The sleeve adapters likewise fit into the bores 131, 161 of excavator 100. Outer circumferential surfaces 412 of the adapters are sized to fit into the bores 131 and 161 of excavator 100.

The bucket 300a may be attached to excavator 100 by first placing the set of adapters 400 in bore 131 of stick 130, and bore 161 of power link assembly 160. The beveled portion 416 assists in aligning and inserting the adapters 400 into the bores. The bucket 300a and stick 130 are positioned relative to one another so bores 131 and 310a are in approximate alignment. Bucket pin 200a can then be inserted into bores 310a and 131. Additional steps may be necessary to permanently secure the joint, depending upon the design of the excavator. Power link assembly 160 and bucket 300a are then positioned relative to one another so bores 161 and 320a are in approximate alignment. Bucket pin 210a can then be inserted into bores 320a and 161. Again, additional steps may be necessary to permanently secure the joint, depending upon the design of the excavator.

Figure 4:
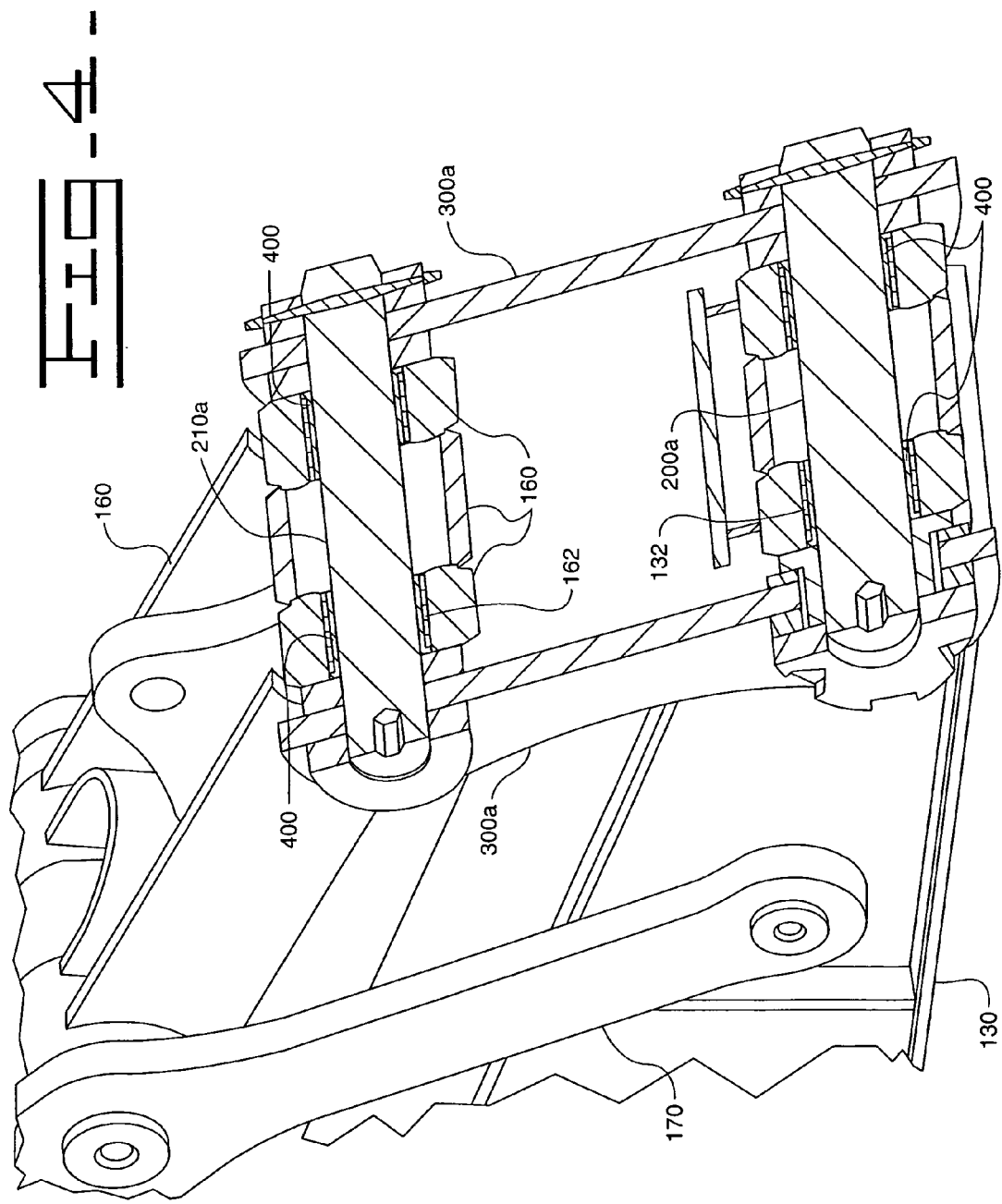
FIG. 4 is an isometric sectional view showing the assembly of the parts in FIG. 3.

FIG. 4 is a cut-away view showing how the sleeve adapters 400, bucket pins 200a, 210a, stick 130, power link assembly 160, and bucket 300a are positioned relative to one another after assembly. A pair of sleeve adapters 400 are sized for and positioned in bore 131 of stick 130. Bucket pin 200a is in turn positioned in bores 420 of the adapters. Second O-ring 451 prevents debris from entering the area between the adapters 400 and the stick 130. Likewise, first O-ring 441 prevents debris from entering the area between bucket pin 200a and the adapters 400. Means are typically provided in an excavator for inserting a lubricant, such a grease, into the bore 131 of stick 130. Grease holes 413 allow the lubricant to pass from the area between the stick 130 and the adapters 400, to the area between the adapters 400 and the bucket pin 200a. Bucket pin 200a is typically attached to bucket 300a such that they rotate together relative to the excavator 100. Sleeve adapters 400a may be either free to rotate relative to bucket pin 200a and stick 130, or sized to remain stationary relative to either bucket pin 200a or stick 130.

The stick 130 may comprise a set of bearings 132 in bore 131. With a typical bucket attachment, the bearings 132 permit bucket pin 200 to easily rotate with respect to the stick 130, and typically a seal is used between stick 130 and bucket pin 200 to protect debris from entering bore 131 and damaging bearings 132. When adapters 400 are used to attach a non-standard bucket, the O-ring 451 on flange 430 and the O-ring 441 perform the important role of keeping damaging debris from reaching bearings 132.

If the stick 130 has bearings 132 in bore 131, the adapters 400 maybe sized so that they either i) rotate freely with respect to both the stick 130 and the pin 200a, or ii) have a secure fit with and do not rotate relative to pin 200a, but are still free to rotate relative to stick 130. Preferably, the fit of adapters 400 is loose enough with respect to the stick 130 and bucket 200a that it can be positioned by hand without needing special tools or presses.

Figure 5:
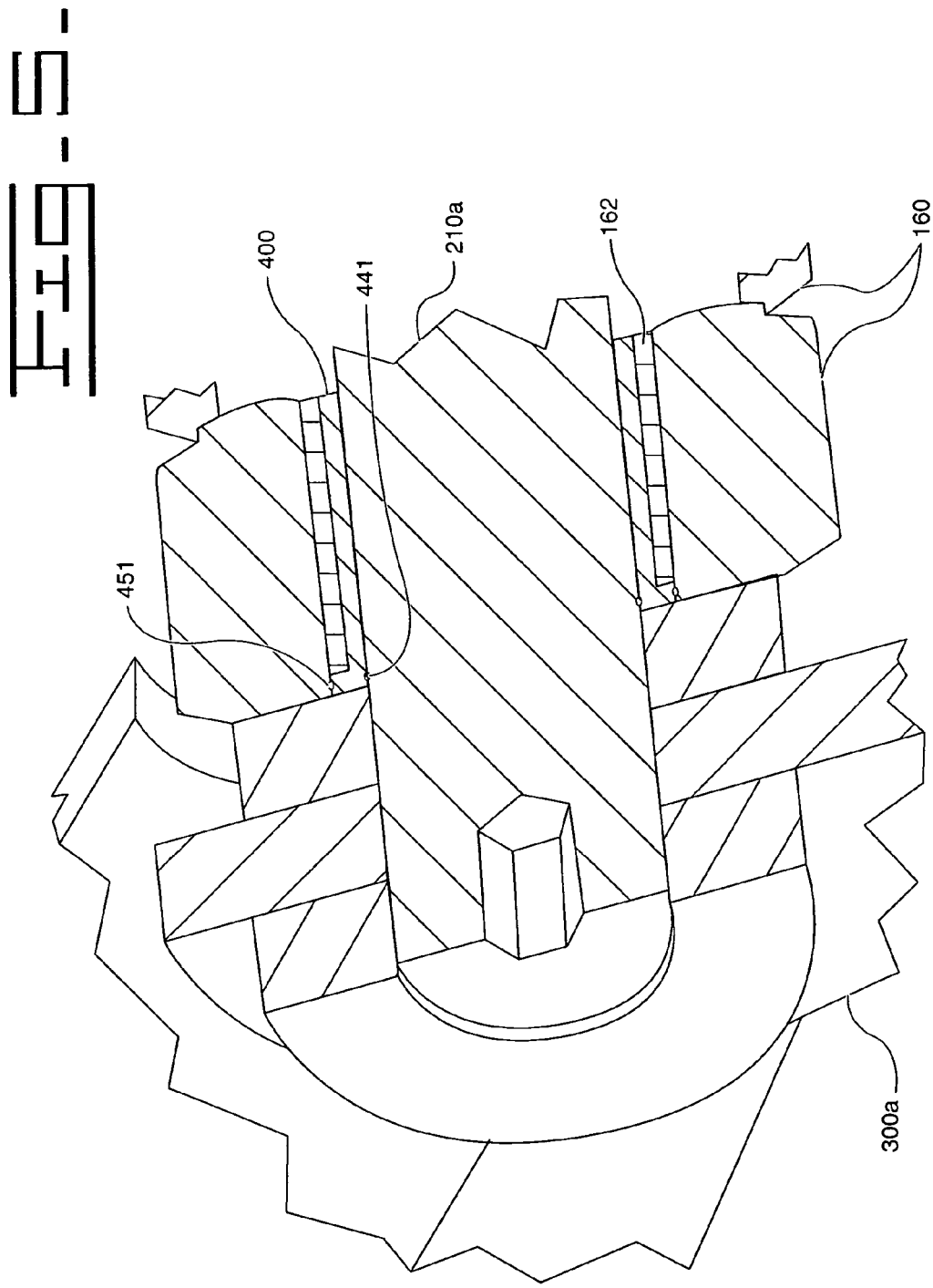
FIG. 5 is an isometric sectional view showing the detail of the sleeve adapter mounted in the assembly of FIG. 4.

Another pair of sleeve adapters are sized for and positioned in a similar manner in bore 161 of power link assembly 160. The function of this set of sleeve adapters 400, including its O-rings and grease holes, is the same as described above for the sleeve adapters 200 positioned in bore 131. Likewise, bearings 162 may be included in bore 161 and interact with the adapters 400 in the same manner as bearings 132 described above. A detail view of a sleeve adapter 400 mounted in pin bore 161 is shown in FIG. 5. The sleeve adapter engages bearing 162, and O-rings 451 and 441 are shown abutting and sealing against the power link assembly 160 and the pin 210a, respectively.

INDUSTRIAL APPLICABILITY

As more fully described above, the sleeve adapters are useful, for example, to permit an excavator bucket to be attached to an excavator for which it was not originally sized. The adapter sleeves fit into bores on the excavator's stick and power link assembly. Pins for attaching the bucket to the excavator in turn are inserted through the bucket and into the sleeves to form pin joints.

We claim:

1. A sleeve comprising:
   an elongated annular portion having a first end and a second end, and an inner circumferential surface and outer circumferential surface, wherein the first and second ends of the elongated annular portion are substantially coextensive with a first end and a second end of the sleeve;
   a flange portion extending radially outward from near the first end of the elongated annular portion, the flange having an outer circumferential surface whose diameter is greater than the diameter of the outer circumferential surface of the annular portion;
   a circumferential first O-ring groove formed on the inner circumferential surface of the annular portion between the first end and the second end;
   a first O-ring positioned in the first O-ring groove;
   a circumferential second O-ring groove formed on the outer circumferential surface of the flange portion; and
   a second O-ring positioned in the second O-ring groove.

2. A sleeve according to claim 1 wherein the first O-ring groove is formed closer to the first end than the second end.

3. A sleeve according to claim 1 further comprising:
   at least one hole from the inner circumferential surface of the annular portion to the outer circumferential surface which permits the flow of lubricant from the outer circumferential surface of the annular portion to the inner circumferential surface.

4. A sleeve according to claim 1 wherein the second end of the annular portion includes a taper portion.

5. A sleeve according to claim 1, wherein the flange portion includes an end face formed by a substantially voidless axially facing surface.

6. A sleeve according to claim 5, wherein the flange portion has a substantially uniform thickness.

* * * * *